US007899053B2

(12) United States Patent
Liu et al.

(10) Patent No.: US 7,899,053 B2
(45) Date of Patent: Mar. 1, 2011

(54) OPTIMAL PATH ROUTING METHOD IN WIRELESS NETWORK

(75) Inventors: Yong Liu, New York, NY (US); Myung-jong Lee, New York, NY (US)

(73) Assignees: Samsung Electronics Co., Ltd., Suwon-si (KR); City University of New York, New York, NY (US)

(*) Notice: Subject to any disclaimer, the term of this patent is extended or adjusted under 35 U.S.C. 154(b) by 322 days.

(21) Appl. No.: 11/430,957

(22) Filed: May 10, 2006

(65) Prior Publication Data

US 2008/0205355 A1  Aug. 28, 2008

Related U.S. Application Data

(60) Provisional application No. 60/679,226, filed on May 10, 2005.

(30) Foreign Application Priority Data

Apr. 17, 2006  (KR) .................. 10-2006-0034556

(51) Int. Cl.
*H04L 12/28* (2006.01)
*H04W 40/00* (2009.01)

(52) U.S. Cl. .............. 370/392; 455/428; 455/449
(58) Field of Classification Search .............. 370/310, 370/328; 455/428, 445, 446, 449
See application file for complete search history.

(56) References Cited

U.S. PATENT DOCUMENTS

| 6,674,757 B1 * | 1/2004 | Zolfaghari | 370/395.31 |
| 6,760,314 B1 | 7/2004 | Iwata | |
| 6,948,000 B2 * | 9/2005 | Desai et al. | 709/245 |
| 2005/0129000 A1 * | 6/2005 | Sivakumar et al. | 370/351 |
| 2005/0259637 A1 | 11/2005 | Chu et al. | |

* cited by examiner

*Primary Examiner*—Michael T Thier
(74) *Attorney, Agent, or Firm*—Sughrue Mion, PLLC

(57) ABSTRACT

An optimal path routing method is provided for transmitting data from a source node to a destination node. The optimal path setting method includes transmitting a shortcut request (SCRQ) message from the source node to a topology server; determining shortcut information at the topology server based on the SCRQ message; and transmitting a shortcut notification (SCNF) message containing the shortcut information from the topology server to the destination node.

15 Claims, 7 Drawing Sheets

FIG. 3A

SCRQ COMMAND

| MAC HEADER | | NETWORK HEADER | | | NETWORK PAYLOAD | |
|---|---|---|---|---|---|---|
| RECEIVER MAC ADDRESS | SENDER MAC ADDRESS | PC NETWORK ADDRESS | PC MAC ADDRESS | SOURCE NETWORK ADDRESS | SOURCE MAC ADDRESS | DESTINATION NETWORK ADDRESS | DESTINATION MAC ADDRESS |

FIG. 3B

SCNF COMMAND

| MAC HEADER | | NETWORK HEADER | | | | NETWORK PAYLOAD | |
|---|---|---|---|---|---|---|---|
| RECEIVER MAC ADDRESS | SENDER MAC ADDRESS | DESTINATION NETWORK ADDRESS | DESTINATION MAC ADDRESS | PC NETWORK ADDRESS | PC MAC ADDRESS | SOURCE NETWORK ADDRESS | SOURCE MAC ADDRESS |
| FIRST RELAY NETWORK ADDRESS | SECOND RELAY NETWORK ADDRESS | THIRD RELAY NETWORK ADDRESS | ○ ○ ○ | NTH RELAY NETWORK ADDRESS | | | |

FIG. 3C

| SCRP COMMAND | | | | | | | |
|---|---|---|---|---|---|---|---|
| MAC HEADER | | NETWORK HEADER | | | | | |
| RECEIVER MAC ADDRESS | SENDER MAC ADDRESS | SOURCE NETWORK ADDRESS | | | | DESTINATION NETWORK ADDRESS | |
| | | NETWORK PAYLOAD | | | | | |
| | | FIRST RELAY NETWORK ADDRESS | SECOND RELAY NETWORK ADDRESS | THIRD RELAY NETWORK ADDRESS | ○ ○ ○ | NTH RELAY NETWORK ADDRESS | |

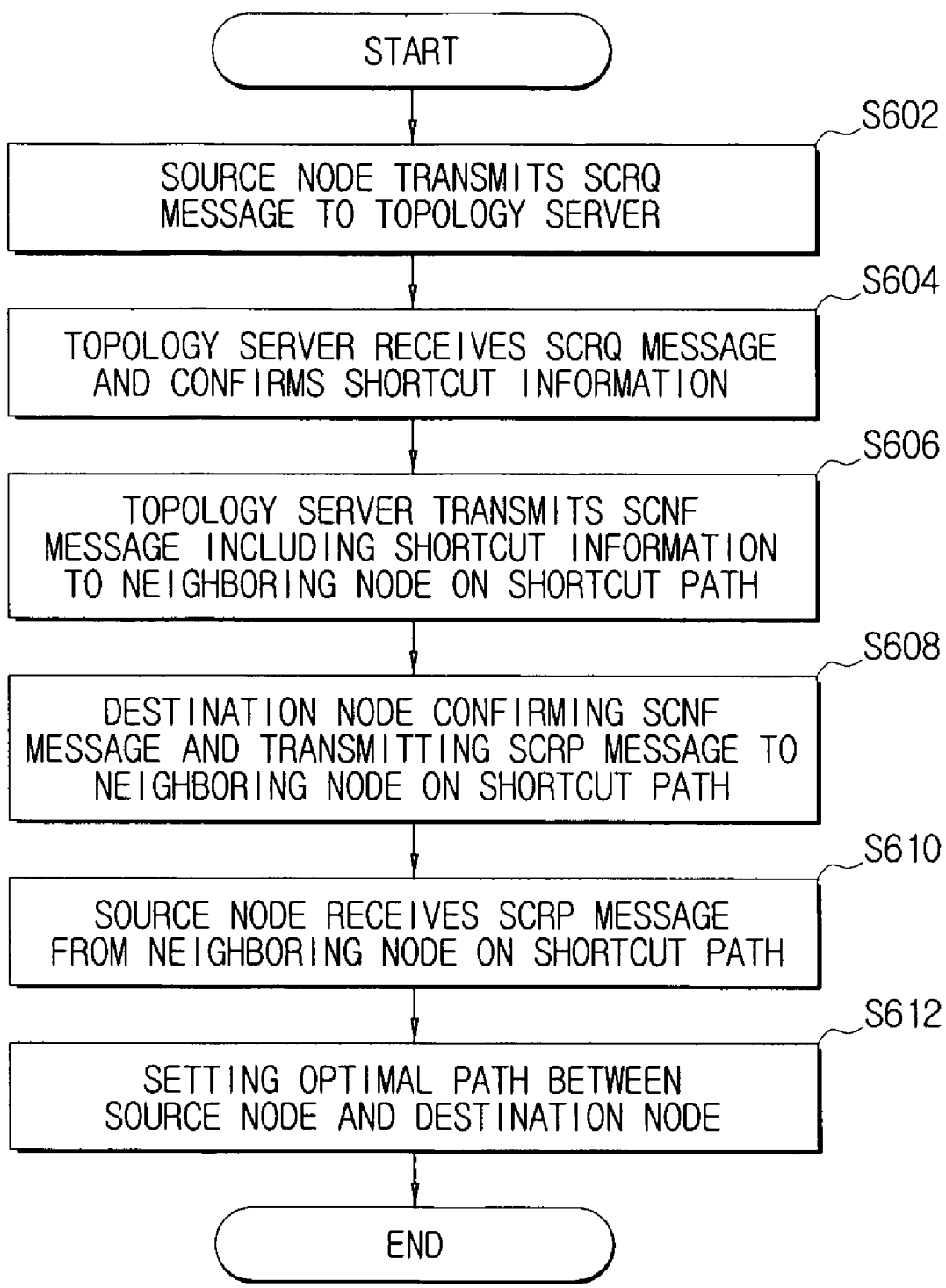

OPTIMAL PATH ROUTING METHOD IN WIRELESS NETWORK

CROSS-REFERENCE TO RELATED APPLICATIONS

This application claims priority from U.S. Provisional Application No. 60/679,226, filed May 10, 2005, in the United States Patent and Trademark Office, and Korean Patent Application No. 10-2006-0034556, filed Apr. 17, 2006 in the Korean Intellectual Property Office, the entire contents of which are incorporated herein by reference.

BACKGROUND OF THE INVENTION

1. Field of the Invention

Methods consistent with the present invention relate to optimal path routing in wireless network, and more particularly, to optimal path routing in a wireless network in which an optimal path is determined and transmitted as a shortcut by a server to a source node or destination node based on data transmitted from the source node to the destination node through a tree mesh structure in the wireless network.

2. Description of the Related Art

Generally, wireless networks have all the devices in a particular area in a cluster-tree structure. Devices joining with the cluster tree structure are allocated with an address according to the tree structure. The allocated address is used for routing in each network environment.

FIG. 1 illustrates a tree structure of a related art wireless network.

In FIG. 1, the related art network includes a parent node A 110 and child nodes B through J, 112 through 142, respectively.

The child node B 112 is associated with the parent node A 110 and the child nodes E 120, F 122 and G 124. The child node C 114 is associated with the parent node A 110 and the child node H 130. The child node D 116 is associated with the parent node A and the child nodes I 140 and J 142. In FIG. 1, each node may be implemented as a device, and each parent node may include table-form address information on the child nodes.

When data is transmitted from the node H 130 to the node F 122 in the wireless network of FIG. 1, the node H 130 is a source node and the node F 122 is a destination node. A data packet transmitted from the node H 130 is transmitted along the only tree structure to the node F 122. The data packet is transmitted necessarily through the parent node thereof, so that it can be transmitted to neighboring nodes along the tree structure.

Accordingly, the data packet transmitted from the node H 130 is sent to node F 122 via the nodes C 114, A 110 and B 112 along the tree structure. In the tree structure of the related art wireless network, the data packet is transmitted along the tree structure from the source node to the destination node, resulting in an inconveniently lengthened routing path and subsequent rise in the communication costs.

Compared to the tree mesh structure, the tree structure of a wireless network is unable to transmit the data packet in a case where there are any errors occurring on an arbitrary node of the routing path, making the network difficult to maintain.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

The present invention provides an optimal path routing method, which an optimal path transmitting data in a shortcut with the help of a server or a coordinator when the data is transmitted from a source node to a destination node through a tree mesh structure in the wireless network.

According to an aspect of the present invention, there is provided an optimal path setting method for transmitting data from a source node to a destination node, the optimal path setting method comprising: performing a shortcut request for transmitting a shortcut request (SCRQ) message to a topology server from the source node; generating shortcut information for the topology server to transmit the data from the source node to the destination node based on the shortcut request message; and transmitting the shortcut notification message containing the shortcut information message for the topology server to the destination node.

The optimal path setting method may further comprise: responding to the shortcut request for the destination node transmitting a shortcut response (SCRP) message to a neighboring node on a shortcut path based on the shortcut information; and setting the optimal path for setting the optimal path between the source node via the neighboring node on the shortcut path and the destination node, by the neighboring node on the shortcut path transmitting the SCRP message to the source node.

The SCRP message may comprise a media access control (MAC) header, a network header and a network payload. The MAC header may comprise the receiver MAC address and the sender MAC address, the network header may comprise a source network address and a destination network address, and the network payload comprises a first relay network address, a second relay network address, a third relay network address and a $n^{th}$ relay network address.

The topology server may set the shortcut information corresponding to the optimal path transmissible in a shortest distance from the source node to the destination node, based on addresses of lower nodes connected to the topology server. The topology server may store in an information table node information containing network addresses of the lower nodes connected thereto and the MAC address.

The shortcut request message may comprise an MAC header, a network header and a network payload. The MAC header may comprise a receiver MAC address and a sender MAC address, the network header may comprise a PC network address, a source network address and a source MAC address, and the network payload may comprise a destination network address and a destination MAC address.

The SCNF message may comprise the MAC header, the network header and the network payload. The MAC header may comprise the receiver MAC address and the sender MAC address, the network header may comprise the destination network address, the destination MAC address, the PC network address and the PC MAC address, and the network payload may comprise the source network address, the source MAC address, the first relay network address, the second relay network address, the third relay network address and the $n^{th}$ relay network address.

The SCRQ message and the SCNF message may be in a command form.

When the source node and the destination node are located in an area other than a server coverage area (SCA) of the topology server, the topology server may generate shortcut information on a shortest path of nodes in the SCA area, in the step of generating the shortcut information.

In the performing the shortcut request, when the topology server is in error, neighboring nodes of the topology server may replace the topology server and receive the SCRQ message.

The neighboring node may generate the shortcut information based on the SCRQ message, and transmit the SCNF message containing the shortcut information to the destination node via the neighboring node thereof.

Other neighboring nodes of the neighboring node replacing the topology server may operate by a backup server with respect to the neighboring node.

BRIEF DESCRIPTION OF THE DRAWING FIGURES

The above and other aspects of the present invention will become more apparent by describing in detail exemplary embodiments thereof with reference to the attached drawings, wherein;

FIGS. 3A, 3B and 3C illustrate a frame structure between a SCRQ message, a SCNF message and a SCRP message;

FIG. 6 is an operational flowchart of the optimal path setting method according to an exemplary embodiment of the present invention.

DETAILED DESCRIPTION OF EXEMPLARY EMBODIMENTS

Figure 1:
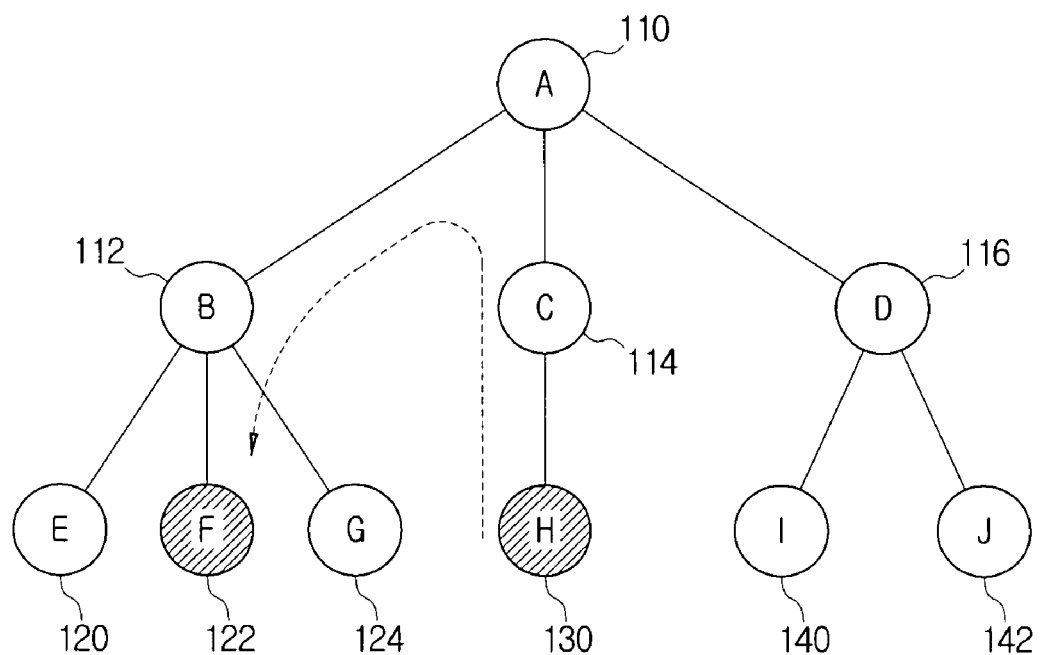
FIG. 1 illustrates a tree structure of a related art wireless network.

Hereinafter, exemplary embodiments of the present invention will be described in detail with reference to the accompanying drawings.

In the following description, same drawing reference numerals are used for the same elements even in different drawings. The matters defined in the description, such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
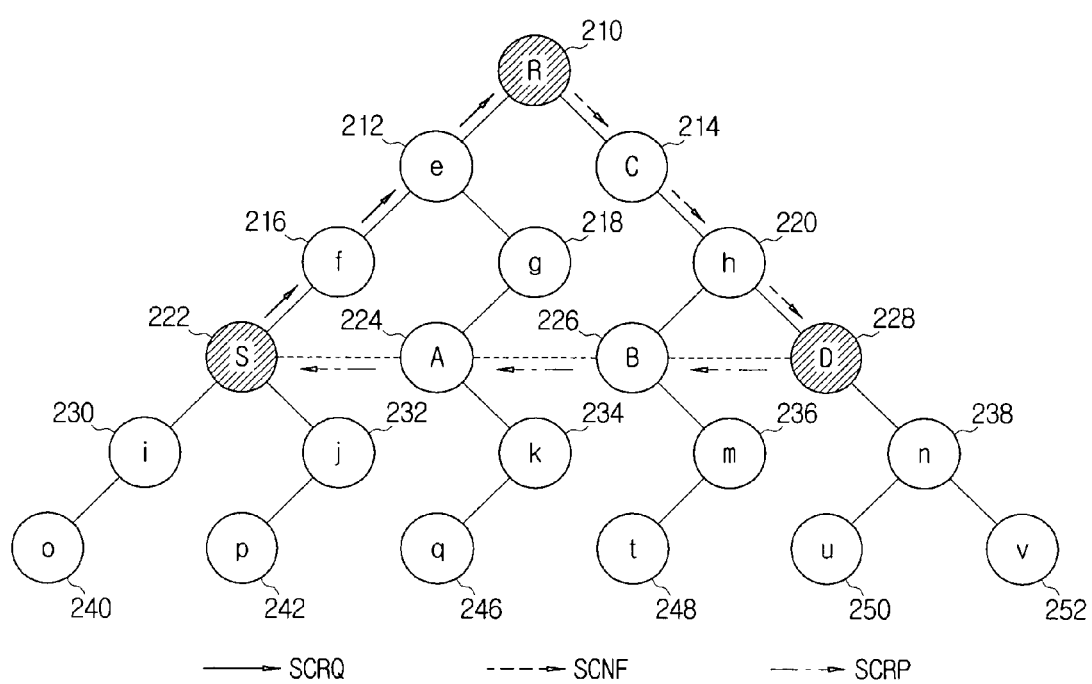
FIG. 2 illustrates a tree mesh structure of a wireless network provided to explain an optimal path setting method for according to an exemplary embodiment of the present invention.

FIG. 2 illustrates a tree mesh structure of a wireless network provided to explain an optimal path setting method according to an exemplary embodiment of the present invention.

According to the exemplary embodiment of the present invention, the wireless network includes a source node S 222, a topology server R 210, a destination node D 228, coordinators e 212, c 214, f 216, h 220, A 224, and B 226, and neighboring nodes g 218 and i 230 through v 252. The source node S 222, the destination node D 228 and coordinators e 212, c 214, f 216, h 220, A 224 and B 226 may be devices for transmitting and receiving data.

In FIG. 2, the source node S 222 transmits data, and the destination node D 228 receives data transmitted from the source node 222.

The topology server R 210 is the highest node in the wireless network forming the tree mesh structure and stores, in an information table, node information including network addresses and MAC addresses of lower nodes connected thereto.

If an arbitrary source among the lower nodes requests data transmission, the topology server R 210 searches the information table and confirms the destination node for the data to be transmitted. If the destination node is confirmed through the information table, the topology server R 210 sets shortcut information equivalent to the optimal path for transmitting the data in a short distance from the source node to the destination node. The topology server R 210 transmits the optimal path setting information to nodes on the optimal path.

The nodes on the optimal path form the optimal path through the optimal path setting information. Accordingly, the data transmitted from the source node S 222 is sent to the destination node D 228 through the optimal path, and not via the topology server R 210. Two or more topology servers R 210 may operate as each other's backup nodes.

In FIG. 2, the node e 212, which is a child node of the topology server R 210, is connected to the nodes h 220 and g 218 as a parent node thereof. Also, the node h 220 is a child node of the node c 214 which is the child node of the topology server R 210, and is connected to the nodes B 226 and D 228 as the parent node thereof.

In the wireless network of FIG. 2, one of the coordinators e 212, c 214, f 216, h 220, A 224 and B 226, or nodes with sufficient resources may operate like the topology server R 210. Nodes other than the topology server R 210 may use tree routing, to reach the topology server R 210.

Each of the coordinators e 212, c 214, f 216, h 220, A 224 and B 226 report to the topology server R 210 major link changes such as beacon message scanning or data transmission failure of neighboring nodes. The coordinators e 212, c 214, f 216, h 220, A 224 and B 226 are aware of an address of the topology server R 210 for joining the network and address information of children nodes thereof.

Referring to FIG. 2 and an operational flowchart in FIG. 6, the optimal path setting method is described.

In order to transmit the data to the destination node D 228, the source node S 222 transmits a shortcut request (SCRQ) message to the topology server R 210 along a tree route via the nodes f 216 and e 212 which are higher nodes thereof (S602).

The SCRQ message is in a command form, containing information on MAC addresses including the addresses of the source node S 222 and the destination node D 228, and a network address.

That is, as illustrated in FIG. 3A, the frame structure of the SCRQ command transmitted to the topology server R 210 from the source node S 222, includes an MAC header, a network header, and a network payload. The MAC header includes a receiver MAC address and a sender MAC address. The network header includes a PC network address, a PC MAC address, a source network address, and a source MAC address. The network payload includes a destination network address and a destination MAC address.

The topology server R 210 receives the SCRQ message transmitted from the source node S 222 and determines shortcut information based on address information in the SCRQ message (S604).

That is, the topology server R 210 searches the information table and, based on the address information of each of the nodes, determines which nodes are to be used for setting the shortcut path for transmitting the data from the source node S 222 to the destination node D 228.

It is confirmed that the nodes A 224 and B 226 are needed for the shortcut path for transmitting the data from the source node 222 to the destination node 228.

The topology server R 210 generates shortcut information including address information of the nodes A 224 and B 226 on the shortcut path, and transmits a shortcut notification (SCNF) message including the shortcut information to the destination node D 228 (S606). The topology server R 210 may also send the SCNF message including the shortcut information to the source node 222.

The frame structure of the SCNF message transmitted from the topology server R 210 to the source node S 222 or the destination node D 228, includes the MAC header, the network header and the network payload, as illustrated in FIG. 3B. The MAC header includes the receiver MAC address and the sender MAC address. The network header has the destination network address, the destination MAC address, the PC network address and the PC MAC address. The network payload includes the source network address, the source MAC address, a first relay network address, a second relay network address, a third relay network address and an $n^{th}$ relay network address, where n is an integer greater than 3.

The destination node D 228 receives the SCNF message transmitted by the topology server R 210 and confirms the shortcut information. The destination node D 228 generates a shortcut response message (SCRP) based on the shortcut information. Also, based on the shortcut information, the destination node D 228 transmits the SCRP message to the neighboring node B 226 on the shortcut path (S608).

The frame structure of the SCRP message transmitted from the destination node D 228 to the neighboring node B 226, includes the MAC header, the network header and the network payload, as illustrated in FIG. 3C. The MAC header has the receiver MAC address and the sender MAC address. The network header has the source network address and the destination network address. The network payload includes the first relay network address, the second relay network address, the third relay network address and the $n^{th}$ relay network address.

The neighboring node B 226 of the destination node D 228 receives the SCRP message and confirms the neighboring node A 224 thereof on the shortcut path, through the shortcut information included in the SCRP message. The node B 226 transmits the SCRP message including the shortcut information to the node A 224 neighboring thereof on the shortcut path.

The neighboring node A 224 of the node B 226 receives the SCRP message from the node B 226, and based on the shortcut information in the SCRP message, sends the SCRP message to the source node S 222.

The source node S 222 receives the SCRP message from the neighboring node on the shortcut path (S610).

Accordingly, the optimal path is set via the node A 224 and the node B 226 between the source node S 222 and the destination node D 228 (S612).

Figure 4:
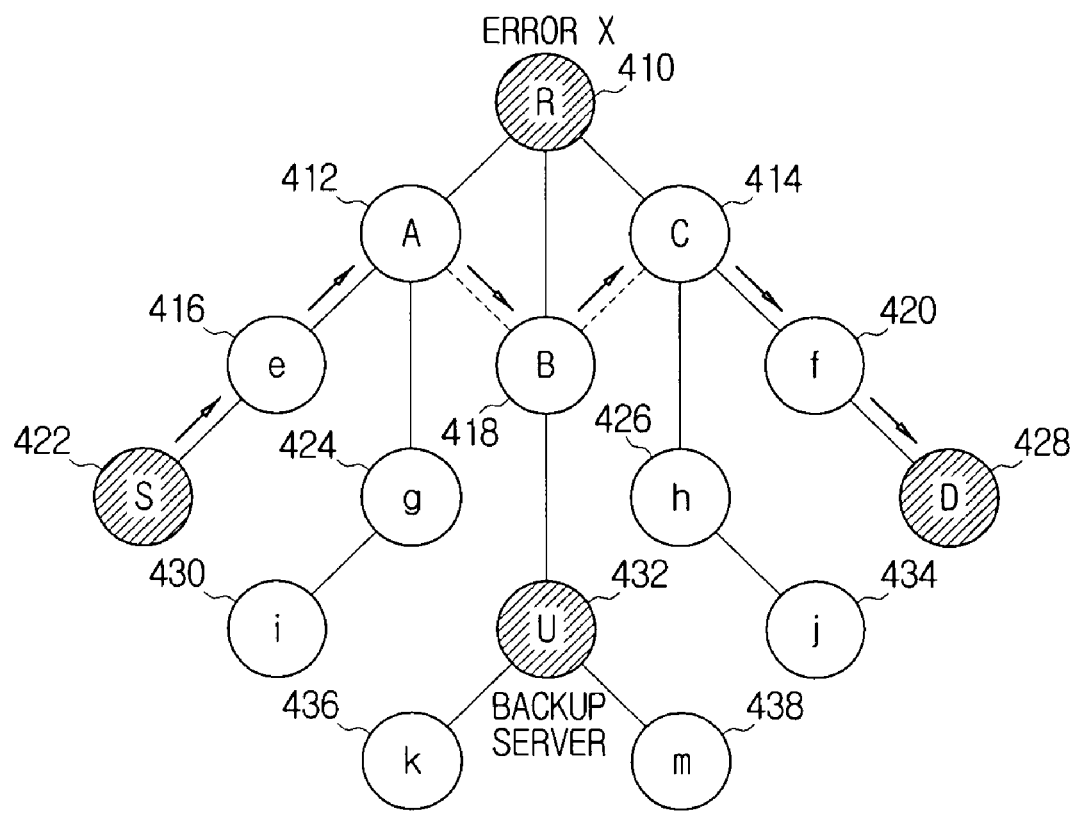
FIG. 4 illustrates a data transmitting path in case of errors of a topology server.

As illustrated in FIG. 4, there may be data transmission failures due to errors of the topology server R 410, when the data is transmitted from the source S 422 to the destination node D 428 through the topology server 410.

In FIG. 4, the source node S 422 transmits data to the higher node e 416, and the node e 416 transmits the data to the higher node A 412.

The node A 412 as the child node of the topology server R 410 recognizes that the topology server R 410 has an error, and transmits the data to the node B 418 in the same level as the child node of the topology server 410.

The node B 418 as the child node of the topology server R 410 transmits the data received from the node A 412 to the neighboring node C 414 as the child node of the topology server R 410.

The node C 414 as the child node of the topology server R 410 confirms, through the data received from the node B 418, that the destination node is the child node thereof. The node C 414 transmits the data to the node f 420 as the child node thereof.

The node f 420 confirms that the destination node is the child node thereof, and transmits the data to the destination node D 428 as the child node.

As abovementioned, the mesh-structured network according to exemplary embodiments of the present invention, may transmit the data through a node substitute for the topology server R 410 when the topology server R 410 on the data transmission path is in error. The neighboring node substitute for the topology server R 410 generates the shortcut information based on the SCRQ message, and transmits the SCNF message including the shortcut information to the destination node D 428, via the neighboring node.

A node U 432 represents another topology server as a neighboring node of the node B 418 that may act as a substitute server when the topology server 410 in error. That is, the server U 432 may operate as a backup server with respect to the node B 418.

Figure 5:
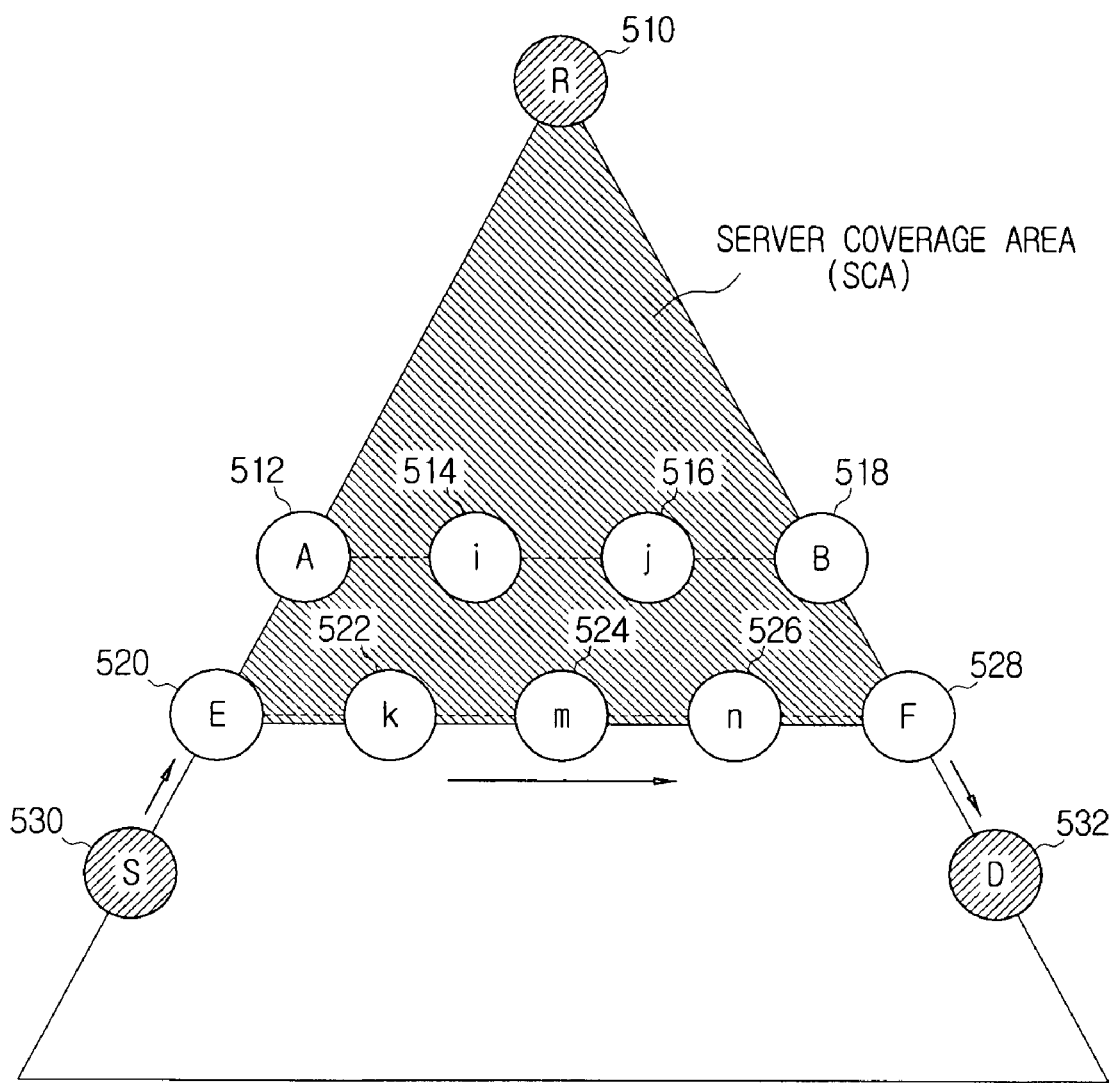
FIG. 5 illustrates a transmitting path according to a request for data transmitting from areas other than a coverage area of the topology server.

FIG. 5 illustrates a transmitting path according to a request for data transmitting from areas other than a coverage area of the topology server.

As illustrated in FIG. 5, the source node S 530 for transmitting the data and the destination node D 532 for receiving the data transmitted form the source node S 530 may be positioned in areas other than the SCA of the topology server R 510.

If the source node S 530 transmits the SCRQ message to the topology server R 510 via node E 520 and the node A 512, the topology server R 510 confirms the shortcut information going via the SCRQ thereof, based on the SCRQ message.

The topology server R 510 searches the information table and generates shortcut information on a shortest path going via the nodes in the SCA thereof. The shortcut information is on the optimal path data-transmissible in a shortest distance from the source node S 530 to the destination node D 532. That is, first shortcut information or a second shortcut information may be generated. The first shortcut information includes node A 512, node I 514, node j 516 and node B 518, and the second shortcut information includes the node E 520, node k 522, node m 524, node n 526 and node F 528.

The topology server R 510 transmits an SCNF message including the first and second shortcut information to the destination node D 532.

The destination node D 532 transmits an SCRP message including the first and second shortcut information to the source node S 530, via the neighboring node on the shortcut path.

Accordingly, the optimal path may be set between the source node S 530, a neighboring node corresponding to the first shortcut information and the destination node D 532, or the optimal path may be set between the source node S 530, a neighboring node corresponding to the second shortcut information and the destination node D 532. information and the destination node D 532.

As abovementioned, according to the present invention, the data is transmitted along the optimal path set based on the shortcut information such that the routing path is shortened, and accordingly, communication cost savings are realized.

Also, in case of any errors in an arbitrary node on the routing path, it is possible to transmit the data through another node that substitutes for the node in error, and accordingly maintenance of the network becomes easier.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An optimal path setting method for transmitting data from a source node to a destination node, the optimal path setting method comprising:

transmitting a shortcut request (SCRQ) message from the source node to a topology server;

determining shortcut information at the topology server based on the SCRQ message;

transmitting a shortcut notification (SCNF) message containing the shortcut information from the topology server only to the destination node;

transmitting a shortcut response (SCRP) message from the destination node to a neighboring node on a shortcut path, in a state that no information has been transmitted from the neighboring node to the destination node, the SCRP message generated based on the shortcut information contained in the SCNF message;

transmitting the SCRP message from the neighboring node on the shortcut path to another neighboring node on the shortcut path in a state that no information has been transmitted from the another neighboring node to the neighboring node;

repeating transmission of the SCRP message until the another neighboring node becomes the source node; and setting an optimal path between the source node via the neighboring node on the shortcut path and the destination node in accordance with the SCRP message, wherein the optimal path is not set until after the source node receives the SCRP message, the SCRP message comprises a media access control (MAC) header, a network header and a network payload, and the MAC header of the SCRP message comprises a receiver MAC address and a sender MAC address, the network header of the SCRP message comprises a source network address and a destination network address, and the network payload of the SCRP message comprises a plurality of relay network addresses.

2. The optimal path setting method of claim 1, wherein the topology server determines the shortcut information corresponding to the optimal path transmissible in a shortest distance from the source node to the destination node, based on addresses of lower nodes connected to the topology server.

3. The optimal path setting method of claim 2, wherein the topology server stores, in an information table, node information containing network addresses of the lower nodes connected thereto and MAC addresses.

4. The optimal path setting method of claim 1, wherein the SCRQ message comprises a MAC header, a network header, and a network payload.

5. The optimal path setting method of claim 4, wherein the MAC header of the SCRQ message comprises the receiver MAC address and the sender MAC address, the network header of the SCRQ message comprises a PC network address, the source network address and a source MAC address, and the network payload of the SCRQ message comprises the destination network address and a destination MAC address.

6. The optimal path setting method of claim 1, wherein the SCNF message comprises a MAC header, a network header and a network payload.

7. The optimal path setting method of claim 6, wherein the MAC header of the SCNF message comprises the receiver MAC address and the sender MAC address, the network header of the SCNF message comprises the destination network address, a destination MAC address, a PC network address and a PC MAC address, and the network payload of the SCNF message comprises the source network address, a source MAC address, and the plurality of relay network addresses.

8. The optimal path setting method of claim 1, wherein the SCRQ message and the SCNF message are in a command form.

9. The optimal path setting method of claim 1, wherein the determining the shortcut information comprises generating at the topology server shortcut information on a shortest path of nodes in a server coverage area (SCA) of the topology server if the source node and the destination node are located in an area other than the SCA area.

10. The optimal path setting method of claim 1, wherein if the topology server is in error, a neighboring node of the topology server replaces the topology server and receives the SCRQ message.

11. The optimal path setting method of claim 10, wherein the neighboring node of the topology server determines the shortcut information based on the SCRQ message, and transmits the SCNF message containing the shortcut information to the destination node via the neighboring node thereof.

12. The optimal path setting method of claim 10, wherein a neighboring node of the neighboring node replacing the topology server, operates as a backup server with respect to the neighboring node.

13. The optimal path setting method of claim 1, wherein the SCRP message is transmitted from the destination node to the source node though neighboring nodes on the shortcut path in sequence.

14. An optimal path setting method for transmitting data from a source node to a destination node, the optimal path setting method comprising:

transmitting a shortcut request (SCRQ) message from the source node to a topology server;

determining shortcut information at the topology server based on the SCRQ message;

transmitting a shortcut notification (SCNF) message containing the shortcut information from the topology server only to the destination node;

transmitting a shortcut response (SCRP) message from the destination node to a nearest neighboring node on a shortcut path in a state that no information has been transmitted from the neighboring node to the destination node, the SCRP message generated based on the shortcut information contained in the SCNF message;

transmitting the SCRP message from the nearest neighboring node on the shortcut path to a next nearest neighboring node on the shortcut path in a direction towards the source node in a state that no information has been transmitted from the another neighboring node to the neighboring node;

repeating transmission of the SCRP message until the next nearest neighboring node becomes the source node; and setting an optimal path between the source node via the neighboring node on the shortcut path and the destination node in accordance with the SCRP message, wherein the optimal path is not set until after the source node receives the SCRP message, the SCRP message comprises a media access control (MAC) header, a network header and a network payload, and the MAC header comprises a receiver MAC address and a sender MAC address, the network header comprises a source network address and a destination network address, and the network payload comprises and a plurality of relay network addresses.

15. The optimal path setting method of claim 14, wherein each node responsible for transmitting the SCRP message transmits the SCRP message only once, to only one other node on the shortcut path.

* * * * *